United States Patent [19]
Tapang

[11] Patent Number: 5,497,974
[45] Date of Patent: Mar. 12, 1996

[54] GEODESIC IGLOO CONSTRUCTOR

[76] Inventor: Carlos C. Tapang, 5440 NW. Condor Pl., Portland, Oreg. 97229

[21] Appl. No.: 220,489

[22] Filed: Mar. 31, 1994

[51] Int. Cl.⁶ .................................................. B29C 33/44
[52] U.S. Cl. .............................. 249/74; 52/81.1; 249/117; 249/136; 249/160; 249/163
[58] Field of Search .......................... 52/81.1; 249/117, 249/136, 139, 160, 163, 167, 74

[56] References Cited

U.S. PATENT DOCUMENTS

| | | | |
|---|---|---|---|
| 436,692 | 9/1890 | Brinham, Jr. et al. | 249/136 |
| 796,939 | 8/1905 | Schwerdtfeger | 249/74 |
| 1,041,033 | 10/1912 | Crist | 249/74 |
| 1,146,199 | 7/1915 | Mostizer | 249/74 |
| 1,454,642 | 5/1923 | Hoglund | 249/74 |
| 1,643,508 | 9/1927 | Miller | 249/136 |
| 1,997,872 | 4/1935 | Nicolette | 249/136 |
| 2,266,844 | 12/1941 | Bouchard | 249/74 |
| 2,345,707 | 4/1944 | Leising | 249/117 |
| 3,043,054 | 7/1962 | Schmidt | 52/81.1 |
| 3,246,870 | 4/1966 | Valdastri, Sr. | 249/74 |
| 3,542,327 | 11/1970 | Herzog | 249/74 |
| 3,609,799 | 10/1971 | Lee | 249/74 |
| 3,696,566 | 10/1972 | Langner | 52/81.1 |
| 3,859,029 | 1/1975 | Kammer | 249/74 |
| 3,881,284 | 5/1975 | Martin | 52/81.1 |
| 4,154,423 | 5/1979 | Crock | 249/117 |

Primary Examiner—James P. Mackey
Attorney, Agent, or Firm—Chernoff, Vilhauer, McClung & Stenzel

[57] ABSTRACT

A pair of molds or forms for constructing a geodesic igloo are described. One of the molds forms a hexagonal block of snow; the other, a pentagonal block. An icosahedron igloo with frequency 3 or 6 is constructed by shovelling snow into the molds, compacting such snow, and then carefully placing the compacted block of snow onto the igloo being constructed.

2 Claims, 4 Drawing Sheets

GEODESIC IGLOO CONSTRUCTOR

This invention relates to a pair of molds for use in constructing an igloo. The igloo constructed is a geodesic dome. One mold is used for packing snow into a hexagonal shape; and the other, into a pentagonal shape. The hexagons and pentagons of packed snow are then put together to construct the igloo. The main problem solved by this invention is that of lifting the compacted block of snow without breaking it or disforming its fragile edges. Lifting a formed block off of the mold and carrying it by hand to its place on the igloo tends to disform the edges by which it is held, or even break it altogether. A block carrier is provided in this invention to prevent disforming the edges or breaking the block of snow. Another problem solved by this invention is that it requires a lot of effort to carry each block of snow from where it is molded to its place on the igloo. Rope attachments are provided on the block carrier for carrying the block of snow with leverage. Once in place, all five sides of a block of snow (or all six sides in the case of a hexagon) are in contact with other blocks (or the ground) so that the block is not liable to break easily but instead contributes to the integrity of the whole igloo structure.

BACKGROUND

Eskimos with enough skill can build igloos in two hours. Inexperienced adults usually find it difficult, if not impossible, to build one. The usual igloo is dome-shaped and is made of rectangular blocks of compact snow. Instead of molding or pressure-forming the blocks of snow, Eskimos cut out rectangular blocks off of a compacted mass of snow using a saw-like cutting tool. It requires a lot of skill to build a dome-shaped structure out of rectangular blocks of snow. The shape of the blocks changes slightly from one row of blocks to the next because the top edge of a row of blocks has to incline towards the center of the structure. The higher the wall, the greater this angle of inclination with respect to the ground, and the more difficult it is to lay the next row of blocks. Also, the spherical wall itself has to curve inwards as it is built towards the top.

U.S. Pat. No. 2,682,235 was granted to Buckminster Fuller in 1954 for geodesic domes. A geodesic dome is a structure derived from about half of a geodesic sphere. The surface of a geodesic sphere is made up of vertices, edges, and planes. The edges define triangular planes, and each vertex is a meeting of either 5 or 6 edges. A vertex that connects 5 edges is the center of a pentagon, and a vertex that connects 6 edges forms the center of a hexagon. Looked at this way, there are always 12 pentagons around a geodesic sphere. In the geodesic igloo there are only 6 pentagons because it is approximately a hemisphere.

The geodesic igloo (hereafter referred to as a bucky igloo) can be constructed easily using the molds described in this invention.

The bucky igloo requires only 6 pentagons, 10 full hexagons, and 5 half hexagons. This corresponds to Fuller's icosahedron with a frequency of 3. An igloo with the shape of an icosahedron with a frequency of 6 can be built with the same molds described here. However, building such igloo can be very challenging because much more blocks are required and each hexagon is not exact.

Reference: "A Fuller Explanation: The Synergetic Geometry of R. Buckminster Fuller", by Amy C. Edmondson, Birkhauser Boston, 1987.

OBJECT OF THE INVENTION

The main purpose of this invention is for one to be able to build an igloo much easier than without it. Even inexperienced adults should be able to build a bucky igloo with this invention.

A second purpose of this invention, which results from the first, is to provide a novel form of recreation for families during winter. Kids enjoy building something out of compact snow, even just a snowman. With the help of this invention, a pair of adults can build a real igloo for kids right in the backyard as long as there is enough compacted snow.

A third purpose is to provide easy-to-build snow shelter to outdoor campers during winter. The summer tent, even with a warm sleeping bag, is not adequate for winter camping. An igloo is the best low-cost dwelling in snow camping areas.

A fourth purpose is to provide winter shelter for animals, and a fifth purpose is to provide storage for food and other valuable objects for protection from severe cold and wild animals.

DESCRIPTION OF THE INVENTION

The details of both the pentagon and hexagon molds will now be described. The only difference between these two molds is the shape of the block of snow which each produce, therefore the details will be described by referring to both molds as the mold. The mold is like a basin in that it has walls set at an angle outward, away from the vertical. The floor of the basin is flat. To make it easy to lift the block of snow off of the mold once it is packed, and also to make it easy to carry the same block to its place on the bucky igloo, the floor of the mold forms a separate structure that can be lifted off of the mold. The floor also serves as a carrier to the block of snow as it is lifted off of the mold. At the center of the floor is a hole, about one-twentieth the diameter of the disk, through which a pipe (or rigid tube), about half as long as the walls are tall, is fastened. The purpose of this pipe is to protect the block of snow from ropes that may be used to lift and carry the block. Such ropes can be led through the pipe and attached to the bottom of the floor and easily detached when the block is already in place. The pipe imparts a small hole at the center of the block of snow formed from the mold. This hole is a useless artifact caused by the pipe, and can be covered by packing it with snow once the block is in place and the floor/pipe assembly is taken off of the block. (Once the bucky igloo is built, the hole in the topmost pentagon can serve a purpose in ventilation and should therefore be left uncovered. If the igloo is to be used for storing objects, the last hole can be covered.)

Alternatively, a rod instead of a pipe can be attached to the center of the floor of the mold. The other end of the rod can be provided with means for attaching a rope.

In order to lighten the block of snow, part of the floor of the mold is raised. This part imparts a dent into the block of snow, thereby reducing its volume and making it lighter. It is preferably circular in shape as it is described in this invention, but can be in any shape. An alternative to making the block of snow lighter is simply to make it smaller and/or thinner. A frequency 3 icosahedron igloo with an inside diameter of about 5.5 feet (or about 1.7 meters) can be built using blocks with sides of 16 inches or 40.6 centimeters and thickness of 6 inches or about 15 centimeters.

The walls of the mold can be disassembled for ease of stowage. At the site where the igloo is to be built, the walls are put together using brackets that slide in place on each corner of the mold. The whole structure is then buried in the snow, but with the top uncovered. Snow is compacted around the walls, on the outside, in order to prevent the walls from buckling or bending when the block itself is being compacted into the mold.

Throughout this description, it should not be assumed that only pentagons and hexagons can be used to build a geodesic igloo. For example, triangles can be used also. Therefore, the mold can be any geometric shape. Pentagons and hexagons are better than triangles for building an igloo because, when laying one on top of another, as much as three sides are in contact with previously installed blocks. In the case of triangles, there are instances in which only one side of the triangle is in contact with previously installed triangles, and therefore such triangular block can be unstable and will not stay in place without extraneous support, specially in the upper parts of the igloo. (Diamond-shaped parallelograms are another possibility that can provide stability to a single block during construction.)

DETAILS

Figure 1:
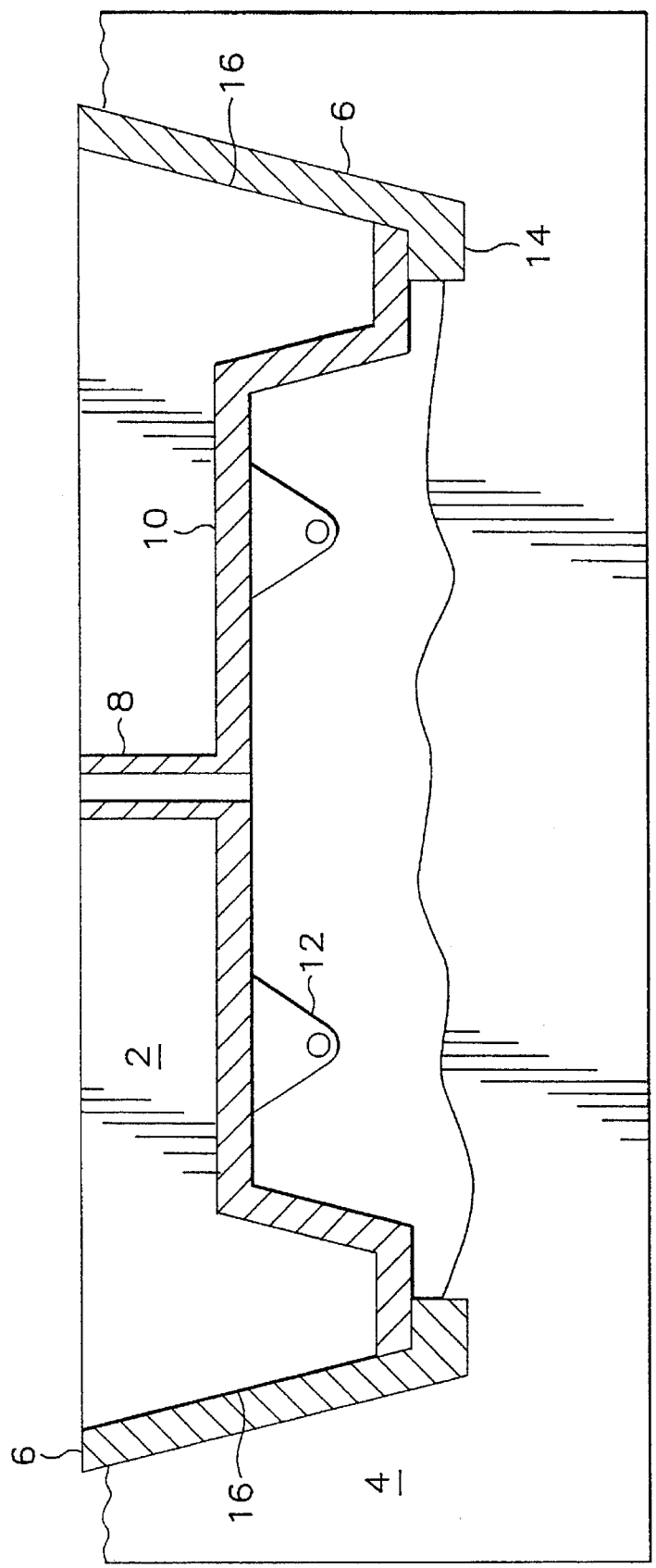
FIG. 1 is a cross-sectional drawing showing how the carrier disk is situated in the mold while snow is being packed into the mold.
Figure 2:
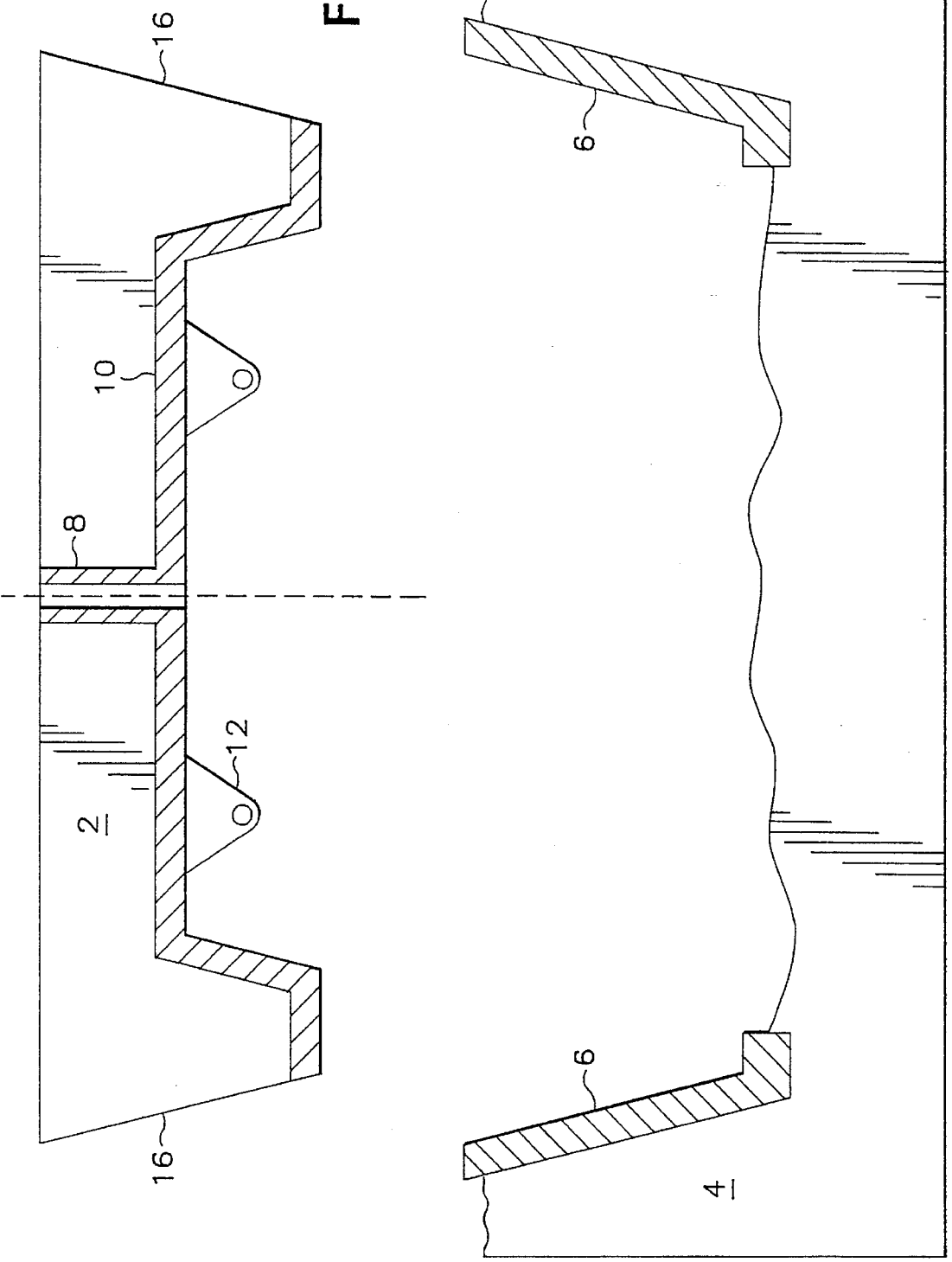
FIG. 2 is a cross-sectional drawing showing how the block of snow is lifted off of the mold by carrier means.

FIGS. 1 and 2 show a cross-sectional drawing of the walls 6 provided with floor rest 14 for supporting the floor assembly 10 which is not fastened to the walls. A pipe 8 provides passage for a rope used for lifting the floor assembly 10 together with the formed block of snow 2. One end of the rope can be tied to a handle 12. One or two handles 12 are located beneath the floor and are used for putting the block 2 in place on the igloo. Once the block is in place, the rope is unfastened, and the floor assembly 10 is separated and removed from the block with the help of both handles 12.

Snow 4 is packed around the walls 6 to lend support such that, while the block 2 is being compacted by one's feet and body weight, the walls will not buckle. Part of the floor assembly 10 is raised to reduce the volume and weight of the block 2 without reducing the area of the sides 16 in contact with other blocks in the finished igloo.

Figure 3:
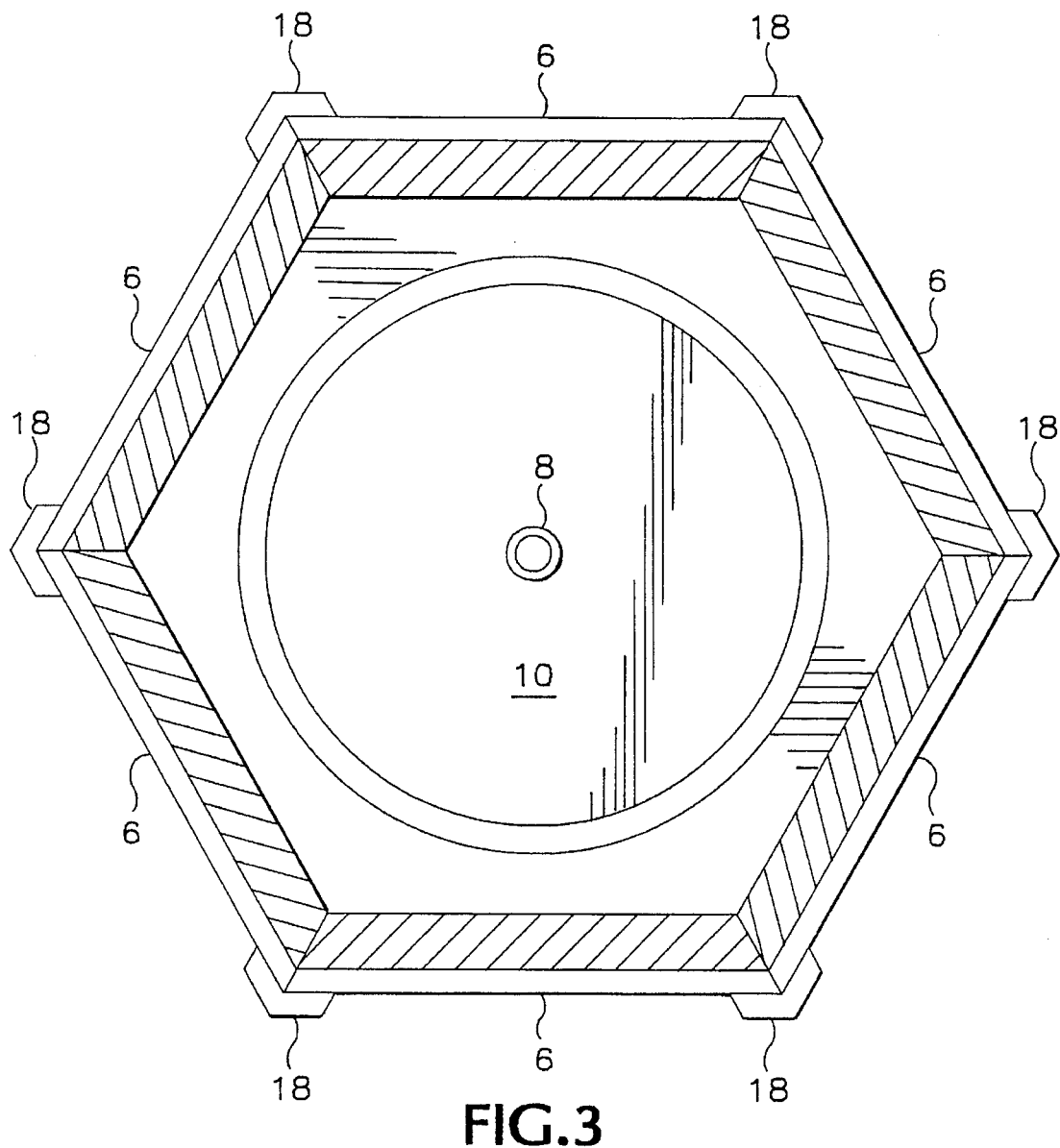
FIG. 3 is a top-view of the hexagonal mold showing the geometrical relationship of the pipe and raised part to the walls of the mold.

FIG. 3 is a top view of the hexagonal mold. The floor assembly 10 fits in between the walls 6, and the pipe 8 is in the center for better balance when the formed block of snow and the floor assembly are being lifted and carried. A circular portion of the floor 10 is raised about halfway from the lowest part of the floor to the top edges of the walls 6. Fasteners or brackets 18 are provided for each corner of the hexagonal shape. These fasteners are removable to allow the walls 6 to come apart when the mold is not in use.

Figure 4:
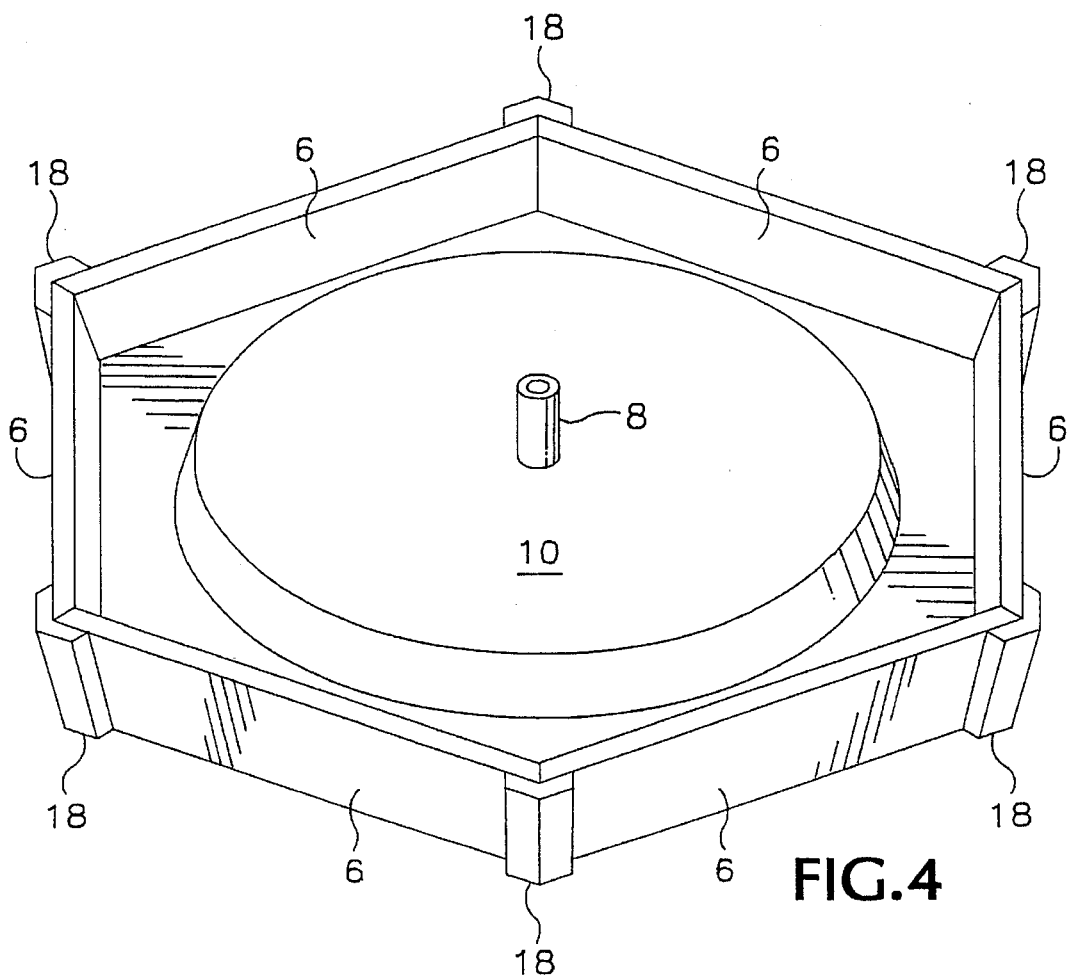
FIG. 4 is a perspective view showing both the mold and carrier disk.

FIG. 4 shows the whole mold structure in perspective. For an igloo constructed as an icosahedron with frequency of 3, the angle of the walls 6 with respect to the horizontal floor 10 should be 69 degrees plus or minus 30 minutes for the hexagon, and 74 degrees plus or minus 30 minutes for the pentagon. These angles are independent of the size of molded blocks, and hence the size of the igloo. The size of the pentagon and the hexagon should be such that each side of the pentagon is equal in length to each side of the hexagon, as measured along the top or outer edge.

A pair of molds for constructing a frequency six icosahedron igloo comprise a hexagonal mold for forming hexagonal blocks of snow, the six sides of the block being set at an angle of 80° plus or minus 15 minutes with respect to the top and bottom surfaces, all of the sides being inclined toward the center of the bottom surface, and a pentagonal mold for forming pentagonal blocks of snow, the five sides of the block being set at an angle of 82° plus or minus 15 minutes with respect to the top and bottom surfaces, all of the sides being inclined toward the center of the bottom surface, and all of the sides having an outer dimension slightly shorter than that of the sides of said hexagonal block.

Figure 5:
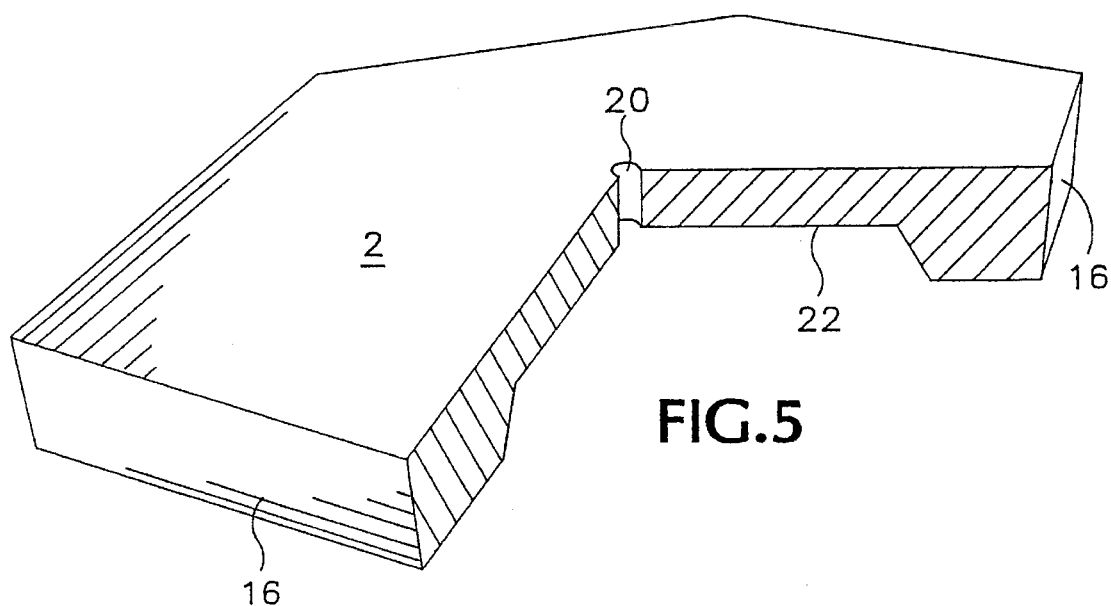
FIG. 5 is a perspective view with a cutout showing the block of compacted snow when it is taken off of the mold and carrier.

FIG. 5 shows a formed block of compact snow 2 with a cutout to show the concave indentation 22. The hole 20 is imparted by the pipe, while the concave indentation 22 is imparted by the raised portion of the floor/carrier. When placed on the igloo, the flat, top surface of this block faces outside; while the indented side faces the inside of the igloo. The sides 16 of a hexagonal block mate with the sides of surrounding hexagons and a pentagon. (The sides of a pentagon mate with the sides of surrounding hexagons.)

The above description shall not be construed as limiting the ways in which this invention may be practised but shall be inclusive of many other variations that do not depart from the broad interest and intent of the invention.

I claim the following:

1. A mold for constructing an igloo, comprising:
   (a) a set of from three to six walls fastenable together to define a mold cavity therebetween;
   (b) a mold floor removably located between said walls to define a bottom of a said cavity;
   (c) a handle attached to an outer surface of said floor; and
   (d) a pipe attached to an inner surface of said floor at the center of said floor, with the bore of said pipe passing through said floor.

2. A mold for constructing an igloo, comprising:
   (a) a set of from three to six walls fastenable together to define a mold cavity therebetween;
   (b) a mold floor removably located between said walls to define a bottom of said cavity;
   (c) a handle attached to an outer surface of said floor; and
   (d) a rod having a first end attached to an inner surface of said floor at the center of said floor, and a second end of said rod including means for attaching a rope.

* * * * *